Patented Mar. 16, 1943

2,313,742

UNITED STATES PATENT OFFICE 2,313,742

PROCESS OF TREATING TEXTILE FIBER

Max Engelmann, Wilmington, Del., and Josef Pikl, Pitman, N. J., assignors to E. I. du Pont de Nemours & Company, Wilmington, Del., a corporation of Delaware No Drawing. Application September 24, 1940, Serial No. 358,138

9 Claims. (Cl. 8—116)

This application is a continuation-in-part of our copending application Serial No. 356,356, filed September 11, 1940, and relates to a process for treating fibrous materials to modify their surface characteristics.

It is an object of this invention to provide a process for imparting water-repellency and softness of feel to fibrous material of vegetable, animal or synthetic origin, using the novel ether compounds described and claimed in said copending application. Other and further important objects of this invention, will appear as the description proceeds.

In our copending application, Serial No. 356,356, above referred to and in a subsequently filed divisional application, Ser. No. 424,904, we have described a series of novel organic compounds which may be designated generally as ethers of organic methylol-amide compounds. They are synthesized from methylol-amides of carboxylic acids on the one hand, and compounds containing alcoholic hydroxyl groups on the other hand. Their general synthesis, and the resulting products may be expressed by the following equation:

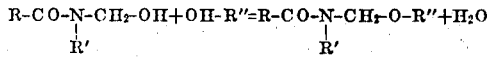

In this equation R is an aliphatic, aromatic, araliphatic, or cyclo-aliphatic radical, which may be attached to the CO group directly or through the agency of a non-carbonic link such as O, S or NH, and preferably contains no water-solubilizing groups, R' is hydrogen or an organic radical, while R" is an organic radical which is attached to the O-atom through the agency of an aliphatic carbon atom. As hydroxy compounds, to react as above with the methylol amides, one may use for instance polyhydroxy compounds, hydroxy-carboxylic acids, hydroxy-phosphonic acids, hydroxy-alkyl-sulfonic acids or their esters, amides and other derivatives which still contain the OH group.

As a special subgroup of the above general family of novel ethers, come to be considered the ethers of the general formula

R—CO—NH—CH₂OR"

wherein R is an aliphatic or cycloaliphatic radical containing at least 7 carbon atoms and attached to the CO group directly or through the agency of oxygen, sulfur or a nitrogen atom, while R" is an organic radical which is attached to the O-atom through the agency of an aliphatic carbon atom. If in this formula R" is selected so as to have water-soluble groups, such as the carboxy, sulfonic or phosphonic acid radical, the resulting ether compounds form valuable agents for aqueous treatment of textile fiber to endow it with water-repellent properties. On the other hand, the compounds in which R" does not possess an acidic group may likewise be used as agents for textile fiber for similar purposes, but must be applied from organic solution, for instance, alcohol, benzene or acetone.

As typical methylol compounds under the above special subgroup may be mentioned

Methylol-stearamide:

Methylol amide of naphthenic acid.
Methylol amide of hydroabietic acid.
Dimethylol of distearamidomethane:

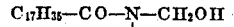
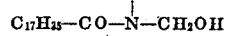

Octadecyl-carbamido-methanol:

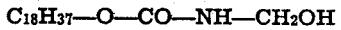

Octadecyl-ureido-methanol:

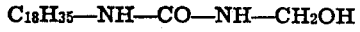

Stearyl-ureido-methanol:

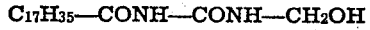

As typical hydroxyl-bearing compounds, carrying acid groups, and therefore usable for the purposes of the present invention, may be named:

Methanol:

Ethanol.
Isopropyl alcohol.
Octyl alcohol.
Cyclohexanol.
Ethylene glycol:

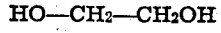

Diethylene glycol:

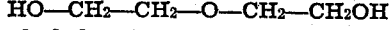

Benzyl alcohol:

Glycollic acid:

Glycollic-acid ethyl-ester:

Lactic acid:

Ethyl lactate:

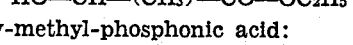

Hydroxy-methyl-phosphonic acid:

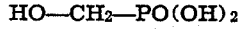

2-Hydroxy-propane-phosphonic acid:

Hydroxy-ethyl-sulfonic acid:

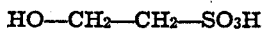

The method of synthesis has been described in detail in our parent application above referred to, and therefore need not be taken up in detail here. Suffice it to say that the methylol amide and the etherifying agent are reacted together, preferably in the presence of an organic solvent or diluent, and heated to a moderate temperature, generally about 40 to 70° C., with or without a catalyst such as phosphorus trichloride, maleic anhydride or anhydrous hydrogen chloride. In many cases the hydroxy compound may be used in such a quantity as to serve also as a solvent or diluent for the reaction. In many cases, the methylol compound may be replaced by the corresponding methylene halide, for instance Stearamido-methylene-chloride:

Bis-chloromethyl-distearamido-methane:

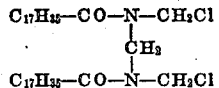

etc.

Our present invention is concerned primarily with the utilization of these novel compounds for the purpose of modifying the surface characteristics of fibrous materials. We have found that the above special group of compounds which are obtained from hydroxy compounds containing free acid groups are soluble in dilute alkaline aqueous media. They are quite stable in alkaline solution and may even be heated for a considerable length of time. They are, however, very sensitive to acids. If the sodium salt, for instance, of stearamido-methoxy-glycollic acid,

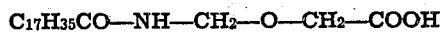

is acidified with hydrochloric acid, the free acid form of this compound is first precipitated, which can be brought back into solution by addition of a base. If, however, the acidified solution is heated for a few minutes, an insoluble product is formed which cannot be dissolved again by the addition of a base.

As already mentioned, the new compounds are characterized by surface-active properties, as a result of which they may be used variously in the textile-treatment arts, for instance as wetting agents, scouring agents, softening agents, emulsifying agents, and as dye-fixing, starch-fixing and waterproofing agents. For the latter purpose, the compounds having a long alkyl chain, say over 7 carbon atoms, and having a weakly-acid, water-solubilizing radical on the hydroxyl-bearing component, for instance a carboxylic-acid or phosphonic-acid radical, are of special interest, in view of the obvious economy of using aqueous treatment baths for textile material over organic solutions. However, regardless of the presence or absence of acidic radicals in the treating agents of this invention, the water-repellent effect on textile fiber obtained by the aid of these compounds is of a permanent nature, in the sense that it is not destroyed by repeated washings with soap or by dry-cleaning agents.

In order to obtain this effect, the textile material is impregnated, for instance, with a 2% aqueous solution of the ammonium salt of the acid-ether compounds and then subjected to a heat treatment for a few minutes at 100 to 170° C. It is believed that the decomposition products obtained by acid hydrolysis as described above are the active principles for the production of the permanent water-repellent and softening effect. It is therefore desirable to use either the free acids or their salts with weak bases in order to obtain the best effect. Such bases are, for instance, primary, secondary or tertiary organic bases such as pyridine, quinoline and their homologues as well as their hydrogenation products; cyclohexylamine, ammonia; methylamine, dimethylamine, trimethylamine, triethylamine, and the ethanolamines. A further increase in the waterproofing effect can be obtained by the use of certain auxiliary agents which produce a temporary acid reaction during the baking step. Such products which have been found to be effective are, for instance, ammonium chloride, pyridine hydrochloride, ammonium thiocyanate, a combination of thiourea or urea and ammonium chloride; sodium dihydrogen phosphate, oxalic acid, etc.

In the case of the compounds containing no salt-forming, acidic radicals, as for instance the ether of methylol-stearamide and methyl alcohol described and claimed in our copending application Ser. No. 424,904, the same may be applied to the fiber directly from organic solution, for instance from alcoholic aqueous-alcoholic or acetone solution. The addition of the special, acid generating assistants above referred to, is nevertheless advisable in this case too.

The novel products of this invention may also be used in combination with other waterproofing agents, such as wax emulsions, or in combination with other types of permanent water-repellency agents, for instance the quaternary-ammonium compounds described in U. S. Patent No. 2,146,392, or the amidomethyl-phosphonic acids of our copending application Serial No. 322,766, or the various water-repellency agents of the isocyanate and ketene classes. The water-repellency produced according to the process outlined above may be further improved if the fibers are aftertreated with metallic salts such as aluminum acetate, aluminum sulfate or zirconium oxy chloride.

The new products present great advantages over other products used for imparting permanent water-repellency, for instance the quaternary pyridinium compounds of U. S. Patent No. 2,146,392, above referred to. First of all, no pyridine is needed for the preparation of our novel products, and the use of these products thus eliminates a great safety hazard and health hazard in the application. Another advantage is the much greater stability of the products which facilitates greatly the application of the products, eliminating if desired the low temperature drying step imperative in the aforegoing pyridinium compounds.

Without limiting our invention to any particular procedure, the following examples are given to illustrate our preferred mode of operation. Parts mentioned are by weight.

*Example 1*

220 parts of glycollic acid were heated to 70° C. and then mixed with 70 parts of acetone. To this mixture, there were added, while agitating, 70 parts of methylol stearamide. After a short time the reaction product became soluble in ammonia. Ice and water were added to the reaction mass to dissolve the excess glycollic acid. The stearamidomethyl ether of glycollic acid was insoluble in water and was filtered off and dried. Recrystallized from methyl alcohol it melted at 97° C. It was very soluble in dilute alkalies. The ammonium salt was prepared as a readily crystallizing compound when ammonia was passed into the solution of the free acid in acetone. It probably corresponded to the formula $C_{17}H_{35}$—CONH—$CH_2$—O—$CH_2$—CO—$ONH_4$ When cotton fabric was impregnated with a 2% aqueous solution of this ammonium salt and then, with or without predrying, subjected for a few minutes to a baking step of 100° to 150° C., the fabric acquired a strongly water-repellent soft finish which was not removed by repeated washings or by dry-cleaning agents.

An improved repellency was obtained when certain auxiliary compounds were added such as thiourea, ammonium thiocyanate, stearamido methyl phosphonic acid, methylol urea, ammonium chloride, or pyridine hydrochloride. All these products have the property in common that they give an acid reaction or an acid decomposition product upon heating to a higher temperature.

Instead of methylol stearamide in the above example, there may be used the methylol compound of a fatty acid amide containing a mixture of 20 and 22 carbon atoms or the methylol compound of montanic acid or of the coconut oil acids.

*Example 2*

30 parts of methylol-stearamide were added to 80 parts of lactic acid of about 90% purity and heated for a few minutes to 60° C. The methylol amide went into solution and the mass became soluble in dilute ammonia. Upon addition of ice and water the excess of lactic acid was separated from the amorphous stearamidomethyl ether of lactic acid which was insoluble in water. The product is believed to have the formula $C_{17}H_{35}$—CONH—$CH_2$—O—CH—COOH
                                   |
                                  $CH_3$ When this product was applied in the same way as described in Example 1 it gave also a strongly water-repellent fabric.

*Example 3*

230 parts of crystalline hydroxy-methyl phosphonic acid were dissolved in 300 parts of acetone warmed to 55° C., and 100 parts of methylol stearamide were added in the course of 10 minutes. The mass became rather thick and the reaction was finished in about 5 minutes. The product was isolated by adding more acetone and cooling to about 10° C.

There were obtained 120 parts of a crystalline material which analyzed for the hydroxy-methyl-phosphonic-acid-ether of methylol stearamide of the following formula $C_{17}H_{35}CO$—NH—$CH_2$—O—$CH_2$—P$\begin{array}{c}\diagup OH\\ \diagdown OH\end{array}$=O This product was quite stable in an alkaline aqueous solution but decomposed readily with acids or by just warming in alcoholic solution.

This reaction may also be carried out in one step by reacting stearamide with formaldehyde and hydroxy-methyl phosphonic acid in acetone solution, or by reacting chloro-methyl stearamide with hydroxy-methyl phosphonic acid.

Cotton cloth was impregnated in an aqueous solution of this product containing 15 parts of the condensation product, 5 parts of ammonia and 15 parts of formaldehyde solution (40%), and then air dried and heated to 120 to 150° C. for 5 minutes. The fabric acquired a water-repellent soft feel.

*Example 4*

125 parts of ethylene glycol were mixed with 15 parts of methylol stearamide and 5 parts of maleic anhydride and then agitated at 60° C. for four hours. After cooling, the reaction product was filtered and then recrystallized from a mixture of alcohol and water. It had a melting point of 86 to 88° C. and was very soluble in alcohol, ether and acetone. The product was presumably the mono-stearamido-methyl-ether of ethylene glycol.

This product was applied to cotton from a 60% alcoholic aqueous solution containing some oxalic acid and then subjected to a baking treatment of 3 minutes at 150° C. It gave a strongly water-repellent finish which was only slightly removed by washing.

*Example 5*

60 parts of methylol-stearamide were mixed with 600 parts of ethyl acetate and 200 parts of diethylene-glycol. The mixture was cooled to 3° C. and one part of $PCl_3$ was added, whereupon the mass was agitated for 8 hours at between 3° and 6° C. After neutralizing the acid present, the reaction product was filtered, and the filter cake was mixed with 300 parts of ethyl alcohol and again filtered. This filtrate yielded upon evaporation stearamidomethyl diethylene glycol mono-ether, which has a melting point at 76 to 78° C.

When this product was applied to a cotton fabric from an alcoholic solution which contained some lactic or acetic acid, it imparted to the fabric a strong water-repellency, which is stable to washing.

*Example 6*

100 parts of glycollic acid were mixed with 25 parts of acetone and warmed to 70° C. Then 25 parts of the methylol amide of hydroabietic acid (obtained by reacting paraformaldehyde and hydroabietic-acid-amide in alkaline alcoholic medium) were added, and the mixture heated for 5 minutes to 65° C. After the reaction was completed, more acetone was added and the clear solution was poured into water and extracted with ether. The ethereal solution was washed several times with water to remove the excess glycollic acid. By passing ammonia into the ethereal solution, the ammonium salt of the hydroabietic amido-methyl ether of glycollic acid was precipitated. It was completely soluble in water and decomposed upon warming with dilute acids.

When rayon taffeta was impregnated with an aqueous solution containing 2.5% of the above prepared sample, 1.75% thiourea, 1.75% $NH_4Cl$, 12% isopropyl alcohol and 3% ammonia and then subjected to a heat treatment at 150° C., the fabric showed water-repellency and had a fine feel. In addition it showed remarkable permanent slip fastness. A seam with 40 stitches per inch resisted a pull of 20 lbs. before washing and 19 lbs. after one washing before showing any slipping. An untreated fabric will stand only a pull of 6 lbs. in the same test.

*Example 7*

200 parts of methyl alcohol were mixed with 30 parts of methylol stearamide and stirred for a few minutes until a uniform mass was formed. One part of concentrated sulfuric acid (monohydrate) diluted with 10 parts of methyl alcohol was then added, and the mixture was heated for 5 hours at a temperature of 50° C. After about one hour's heating the reaction mass became clear. After cooling, the reaction product was filtered and recrystallized from methyl alcohol. The stearamidomethyl methyl-ether formed has a melting point of 88 to 89° C. It was soluble in ethyl alcohol, benzene, ether, carbon tetrachloride, but insoluble in water.

Nitrogen anaylsis: Found N=4.50%.
Calculated for $C_{17}H_{35}CO.NH.CH_2OCH_3$, N=4.28%.

This product was applied to cotton fabric from a 1% solution in acetone also containing 1% of oxalic acid and then subjected to a baking treatment for 10 minutes at 150° C. It gave a strongly water-repellent finish which was only slightly removed by washing.

*Example 8*

6 parts of stearamidomethoxy-glycollic acid, prepared according to Example 1, were dissolved in 200 parts of water containing 2.5 parts of concentrated ammonia (28%) and then 1 part of formaline was added. A piece of cotton goods was padded in this solution, air dried and heated for five minutes to 150° C. A strongly water-repellent fabric was obtained, fast to washing.

The same result was obtained if the ammonia was substituted by tetramethyl-methylene-diamine or diethyl-amino-ethanol.

*Example 9*

5 parts of a mixture comprised of 50 parts of stearamidomethoxy glycollic acid (Ex. 1), 25 parts of ammonium carbonate and 25 parts of ammonium sulfocyanate were dissolved in 100 parts of water containing 10% of ethyl alcohol. Upon slight warming an almost clear solution was obtained. Cotton and rayon fabrics were padded in the solution, air dried and then heated for five minutes to a temperature of 130 to 150° C.

Both fabrics then were strongly water-repellent and had acquired a soft feel. Neither of the properties was markedly impaired by washing or dry-cleaning.

In the above example the fabrics may be subjected to the high temperature treatment right after the padding in the aqueous solution, without predrying. Essentially the same results are obtained.

*Example 10*

10 parts of the glycollic acid ether of the methylol amide obtained by reacting with formaldehyde in alkaline medium upon a mixture of $C_{20}$ and $C_{22}$ fatty acid amides were dissolved in 317 parts of water together with the following reagents:

| | Parts |
|---|---|
| Concentrated ammonia | 12.5 |
| Isopropyl alcohol | 50 |
| Ammonium chloride | 5 |
| Thiourea | 5 |

At 60° C., a clear, rather thin solution was obtained. Cotton and rayon fabrics were padded for a few minutes in this solution, then air dried and subjected for 3 minutes to a temperature of 150° C. The fabric acquired strongly water-repellent properties and had a soft, non-greasy feel. In the above formulation, the thiourea may be replaced by urea, and the ammonia by any other primary, secondary or tertiary amine, such as monoethyl amine, dimethylamine, triethylamine, pyridine, mono-ethanol-amine, the function of the latter being merely to solubilize the ether-acid by forming a salt thereof.

*Example 11*

10 parts of the stearamidomethyl ether of glycollic acid, as prepared according to Example 1, were dissolved in 320 parts of water together with the following addition products:

| | Parts |
|---|---|
| Pyridine | 10 |
| Thiourea | 5 |
| Pyridine hydrochloride | 10 |
| Formaldehyde | 2 |
| Ammonium chloride | 5 |
| Isopropyl alcohol | 50 |

A clear solution resulted when warmed to 50 to 60° C. Cotton fabrics padded in this solution and then heated for 10 minutes to 150° C. were strongly water-repellent. This property was also quite fast to washing and dry cleaning.

In the above example, the function of the pyridine was to solubilize the ether-acid employed; the formaldehyde seems to have a general beneficial effect on the treatment (see copending application of Bacon, Serial No. 336,375); the pyridine-hydrochloride and the thiourea jointly with ammonium chloride act as acid liberating agents at the baking temperature; the function of the isopropyl alcohol is simply to reduce the viscosity of the solution.

In place of the acid catalysts, ammonium chloride and pyridine hydrochloride, other catalysts may be used such as sodium dihydrogen phosphate, ammonium dihydrogen phosphate, stearamidomethyl phosphonic acid, naphthene-amido-methyl phosphonic acid.

In place of the formaldehyde, methylol urea or dimethylol urea may be used or their ethers.

*Example 12*

A mixture of 200 parts of glycollic acid and 75 parts of acetone was heated to 70° C., and then 50 parts of methylol-octadecyl-carbamate (obtained by reacting paraformaldehyde and octadecyl carbamate in alkaline alcoholic medium) were added. After about 15 minutes at 65° C., 600 parts of cold acetone were added and the mixture was agitated for awhile at 30° C. By filtration, there was removed a small amount of an insoluble by-product. From the filtrate the glycollic acid ether of the methyl carbamate.

$$C_{18}H_{35}-O-CONH-CH_2-O-CH_2-COOH$$

was precipitated by addition of water. It was soluble in dilute alkalies and decomposed with warm acids yielding a very insoluble product.

Cotton or rayon padded in an ammoniacal solution of this product, containing some ammonium sulfocyanate, and then heated to 120 to 170° C., became permanently water-repellent.

It will be understood, that although our specific examples above dealt particularly with the treatment of cotton and rayon, this invention is applicable also to the waterproofing of animal fibers, such as wool, silk, leather; of synthetic fiber, such as regenerated cellulose, nylon; and to non-fibrous cellulosic films, such as Cellophane. Furthermore, the details of procedure may be varied within wide limits without departing from the spirit of this invention.

Thus, the concentration of the amido-methylol ether in the treatment bath may vary from 1 to 8% by weight. A good rule to follow is to use such a concentration that after impregnation and squeezing out excess moisture, the fiber shall contain the ether in from 1 to 4% of its own weight. Thus, if the fiber is squeezed until it contains its own weight of moisture, the concentration of the bath may be from 1 to 4%. But if the fiber is squeezed until the pick-up is only 50% of its dry weight, the initial concentration of the treatment bath should be twice as high.

Formaldehyde, dimethylol urea or other agents yielding formaldehyde in aqueous solution may be added to the bath to increase its effectiveness and the permanence of the resulting treatment, in accordance with copending application of O. C. Bacon, Serial No. 336,375. The quantity added may vary from 0 to 3% by weight of the total bath. Higher concentrations may be employed, provided a tertiary amine is employed instead of ammonia for solubilizing the ether-acid.

Isopropyl alcohol may be added to the bath to decrease its viscosity. The addition of acid generating agents has already been discussed above. Other assistants or adjuvants for any special effect whatsoever may be added, if desired, provided these are inert toward the amido-methylol ether at the impregnation temperature. For instance, acid reagents should be avoided in the aqueous treatment baths inasmuch as the water-soluble salts of the novel ether-acids are generally precipitated when treated wtih acids. On the other hand, if an organic solvent treatment bath is employed, in which event the methylol-ether compound is naturally free from acidic groups, acid reagents may be added directly to the treatment bath.

The temperature of impregnation may be varied from room temperature to about 45 to 50° C. Lower or higher temperatures may be used, but there is no apparent advantage.

As already indicated, the intermediate drying step may be employed or omitted, since the presence of moisture during the baking treatment is not so critical here as in the case of octadecyloxy-methyl-pyridinium chloride, for instance.

The baking temperature may vary from 90° to 200° C., but is usually more conveniently selected between 100 and 170° C. The time required for baking varies somewhat inversely with the temperature, and may be as high as 30 minutes at the lower temperature limit and as low as ½ minute at the higher limit. The optimum time for any given reagent and temperature combination may be determined experimentally by treating samples of the chosen fabric and then estimating, by the usual tests, the intensity and durability of the water-repellent effect bestowed on it. Time periods in excess of the optimum do not affect the water-repellency, but tend to weaken the fiber, in the case of cellulose, due to exposure to the acids liberated in the baking step.

In other details, our novel process may follow in general the hitherto established processes for water-proofing fiber with quaternary ammonium compounds as typified by cetyloxy-methyl pyridinium chloride and stearamido-methyl pyridinium chloride.

In the claims below, the expression "higher fatty acid" shall be construed as referring to a fatty acid which has an aliphatic or cycloaliphatic radical of at least 7 carbon atoms. The expression "lower alkyl radical" shall be understood in its usual sense, that is as an alkyl radical having not more than 5 carbon atoms.

We claim:

1. A process of treating textile fiber for the purpose of modifying the surface characteristics thereof, which comprises impregnating the same with an amido-methylol ether of the general formula

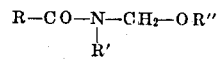

wherein R is an organic radical containing a chain of not less than 7 carbon atoms and being free from water-solubilizing groups, R' is a substituent of the group consisting of hydrogen and organic radicals free from water-solubilizing groups, and R" is an organic radical which is free of quaternary nitrogen atoms and is attached to the O-atom through the agency of an aliphatic carbon atom; and then subjecting the impregnated fiber to the action of heat at a temperature between 90 and 200° C.

2. A process of treating textile fiber for the purpose of modifying the surface characteristics thereof, which comprises impregnating the same with an amido-methylol ether of the general formula

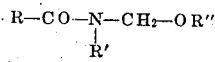

wherein R is a radical of the group consisting of aliphatic and cycloaliphatic radicals containing not less than 7 carbon atoms, being free from water-solubilizing groups and being attached to the CO group through the agency of an atom selected from the group consisting of carbon, oxygen, sulfur and nitrogen; R' is a substituent of the group consisting of hydrogen and organic radicals free from water-solubilizing groups, and R" is an organic radical which is free of quaternary nitrogen atoms and is attached to the O-atom through the agency of an aliphatic carbon atom; and then subjecting the impregnated fiber to the action of heat at a temperature between 90 and 200° C. in the presence of an agent adapted to liberate acid at said temperature.

3. A process of treating textile fiber for the purpose of modifying the surface characteristics thereof, which comprises impregnating the same with an amido-methylol ether of the general formula R—Y—CONH—CH₂—O—R", wherein R is a radical of the group consisting of aliphatic and cycloaliphatic radicals having at least 7 carbon atoms and being free from water-solubilizing groups, Y is an atomic bridge selected from the group consisting of CH₂, O, S, NH and CONH, and R" is an organic radical free of quaternary nitrogen atoms and being attached to the O-atom through the agency of an aliphatic carbon atom; and then subjecting the impregnated fiber to the action of heat at a temperature between 100 and 170° C., for a period of time sufficient to cause decomposition of said amido-methylol ether on the fiber.

4. A process of treating cellulosic textile fiber for the purpose of modifying the surface characteristics thereof, which comprises impregnating the same with an amido-methylol ether of the general formula R—Y—CONH—CH₂—O—R", wherein R is an aliphatic radical having at least 7 carbon atoms and being free from water-solubilizing groups, Y is an atomic bridge selected from the group consisting of CH₂, O, S, NH and CONH, and R" is an organic radical free of quarternary nitrogen atoms and being attached to the O-atom through the agency of an aliphatic carbon atom; and then subjecting the impregnated fiber to the action of heat at a temperature between 100 and 170° C., in the presence of an agent adapted to liberate acid at said temperature, and for a period of time sufficient to cause decomposition of said amido-methylol ether on the fiber.

5. A process for treating cellulosic material for the purpose of rendering the same water-repellent, which comprises impregnating the same with an organic-solvent solution of an amido-methylol ether of the general formula $$R-CONH-CH_2-O-R''$$

wherein R is the alkyl radical of a higher fatty acid, while R'' is an organic radical free from acidic radicals and attached to the O-atom through the agency of an aliphatic carbon atom; and then subjecting the impregnated material to the action of heat at a temperature between 100 and 170° C., in the presence of an agent adapted to liberate acid at said temperature, and for a period of time sufficient to cause decomposition of said amido-methylol ether on the fiber, with a resultant water-repellent effect on said fiber.

6. A process for treating cellulosic material for the purpose of rendering the same water-repellent, which comprises impregnating the same with an aqueous solution of a salt of an amido-methylol ether of the general formula $$R-CONH-CH_2-O-R''$$

wherein R is the alkyl radical of a higher fatty acid, while R'' is an organic radical attached to the O-atom through the agency of an aliphatic carbon atom and containing at least one ionizable acidic radical adapted to form a water-soluble salt but no quaternary nitrogen atoms; and then subjecting the impregnated material to the action of heat at a temperature between 100 and 170° C., in the presence of an agent adapted to liberate acid at said temperature, and for a period of time sufficient to cause decomposition of said amido-methylol ether on the fiber, with a resultant water-repellent effect on said fiber.

7. The process of rendering cellulosic textile material water-repellent, which comprises impregnating the same with an aqueous solution of a water-soluble salt of a methylol-amido-ether of the general formula $$R-CONH-CH_2-O-CH-COOH$$
$$\phantom{R-CONH-CH_2-O-CH-}|$$
$$\phantom{R-CONH-CH_2-O-CH-COO}R'$$

wherein R is the alkyl radical of a higher fatty acid while R' stands for a substituent of the group consisting of hydrogen and lower alkyl; and then subjecting the impregnated material to the action of heat at a temperature between 100 and 170° C. in the presence of an agent adapted to liberate acid at said temperature, and for a period of time sufficient to cause decomposition of said amido-methylol ether on the fiber, with a resultant water-repellent effect on said fiber.

8. In the process of treating cellulosic textile material for the purpose of rendering the same water-repellent, the step which consists of impregnating the material with a water-soluble salt of the stearamido-methyl ether of glycollic acid, and heating the material in absence of moisture to decompose said agent on the fiber.

9. In the process of treating cellulosic textile material for the purpose of rendering the same water-repellent, the step which consists of impregnating the material with a water-soluble salt of the stearamido-methyl ether of lactic acid, and heating the material in absence of moisture to decompose said agent on the fiber.

MAX ENGELMANN.
JOSEF PIKL.